(12) United States Patent
Boyapalle et al.

(10) Patent No.: US 11,663,147 B2
(45) Date of Patent: May 30, 2023

(54) SYSTEM AND METHOD FOR MANAGING PERIPHERAL DEVICES AT AN INFORMATION HANDLING SYSTEM

(71) Applicant: Dell Products, LP, Round Rock, TX (US)

(72) Inventors: Anantha K. Boyapalle, Cedar Park, TX (US); Charles D. Robison, Buford, GA (US); Vaibhav Soni, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 17/500,810

(22) Filed: Oct. 13, 2021

(65) Prior Publication Data

US 2023/0112725 A1    Apr. 13, 2023

(51) Int. Cl.
*G06F 13/10* (2006.01)
*G06F 1/26* (2006.01)

(52) U.S. Cl.
CPC ............... *G06F 13/10* (2013.01); *G06F 1/26* (2013.01); *G06F 2213/40* (2013.01)

(58) Field of Classification Search
CPC ...... G06F 1/28; H04L 41/085; H04L 63/1433
See application file for complete search history.

(56) References Cited

U.S. PATENT DOCUMENTS

| | | | | |
|---|---|---|---|---|
| 2007/0118585 A1* | 5/2007 | Inoue | ...................... | H04L 67/52 709/200 |
| 2017/0082667 A1* | 3/2017 | Liu | ....................... | G01R 22/065 |
| 2017/0139466 A1* | 5/2017 | Grimes | ....................... | G06F 1/28 |
| 2017/0288737 A1* | 10/2017 | Lee | ....................... | G06Q 20/3278 |
| 2019/0190788 A1* | 6/2019 | Bugge | ................... | H04L 41/085 |
| 2020/0403991 A1* | 12/2020 | Sohail | ................. | H04L 63/1433 |

* cited by examiner

*Primary Examiner* — Getente A Yimer
(74) *Attorney, Agent, or Firm* — Prol Intellectual Property Law, PLLC; H. Kenneth Prol

(57) ABSTRACT

An information handling system including a port or wireless antenna to operatively couple one or more peripheral devices to the information handling system and the processor executing code instructions of a peripheral devices reporting module for managing the one or more peripheral devices in coordination for a remotely-located peripheral device management system, wherein the processor is configured to generate a manifest of the information handling system and the one or more peripheral devices, and a network interface device to transmit to the remotely-located peripheral device management system the manifest to be associated a user account for peripheral device management services utilize usage data from the one or more peripheral devices to monitor peripheral device usage lifecycle status or peripheral device health status.

20 Claims, 6 Drawing Sheets

SYSTEM AND METHOD FOR MANAGING PERIPHERAL DEVICES AT AN INFORMATION HANDLING SYSTEM

FIELD OF THE DISCLOSURE

The present disclosure generally relates to an information handling system having one or more peripheral devices operatively coupled thereto. More particularly, the present disclosure relates to monitoring and managing peripheral devices operatively coupled to an information handling system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. A typical information handling system may be operatively coupled to a plurality of peripheral devices and as such, there is a need for managing the peripheral devices.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
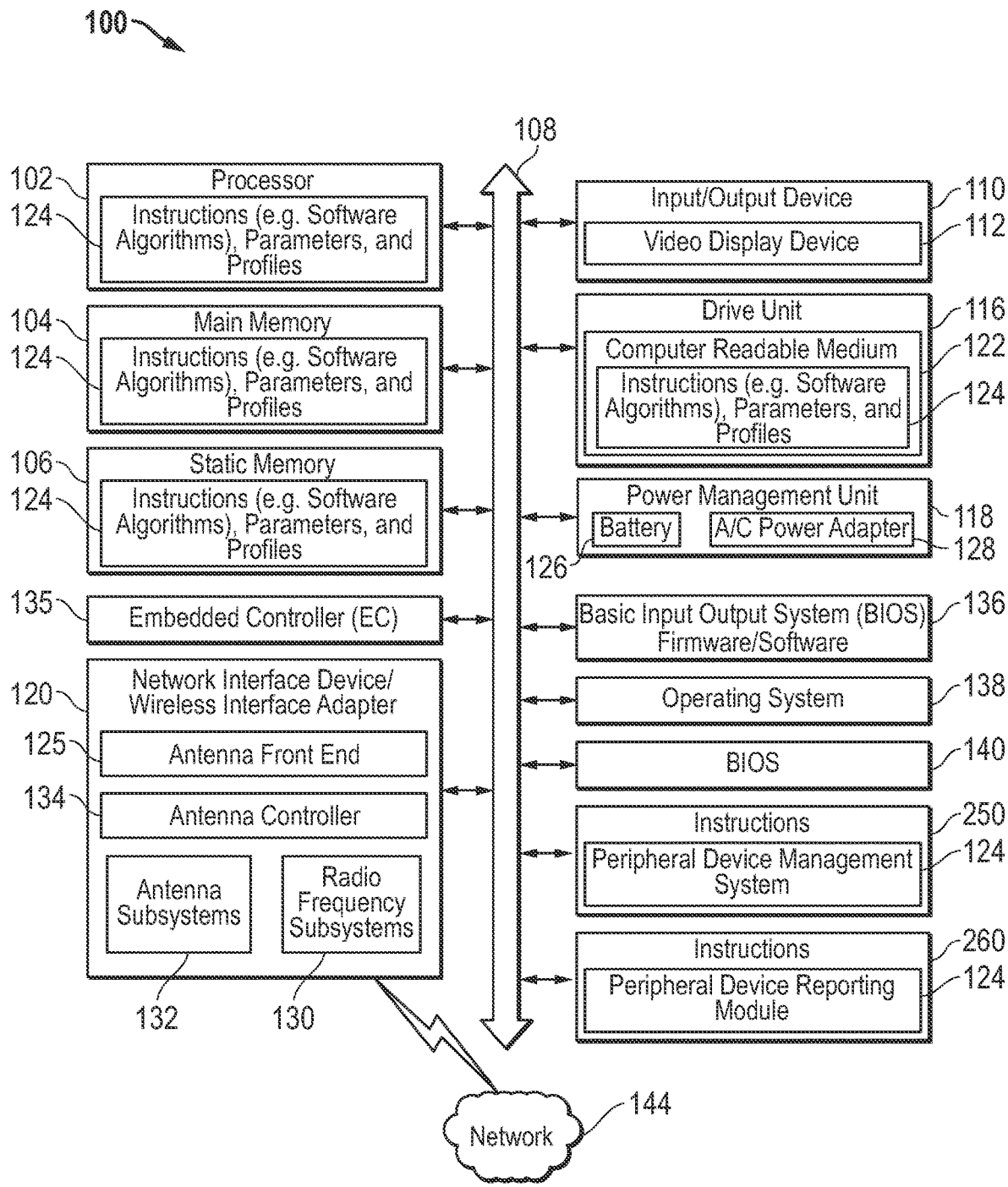
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

A typical information handling system, in a work environment or a home environment, may have a plurality of peripheral devices operatively coupled thereto. These peripheral devices may include a keyboard, a mouse, a display, audio speakers, a docking station, a monitor, a digital camera, a joystick, a microphone, a headset, a projector, a printer, a plotter, a scanner, an external hard drive, or a combination thereof. Further, these peripheral devices may be operatively coupled to the information handling system via a wired connection, a wireless connection, or a combination thereof. For example, the peripheral devices may be operatively coupled to the information handling system via a universal serial bus (USB) connection, a Lightning connection, a FireWire connection, a Thunderbolt, an external serial AT attachment (eSATA) connection, a parallel port, a serial port, a small computer system interface (SCSI) connection, a Bluetooth connection, a Wi-Fi connection, a 5G connection, or a combination thereof.

The systems and methods disclosed herein may allow an information handling system to collect usage data from the peripheral devices operatively coupled thereto. For example, a unified extensible file interface (UEFI) module operating on the basic input output system (BIOS) of the information handling system may passively collect operation data for each peripheral device operatively coupled to the information handling system. In another embodiment, an operating system (OS) module running on the OS of the information handling system may actively collect operation data for each peripheral device operatively coupled to the information handling system. In some embodiments, a peripheral device reporting module may execute on a processor at a client information handling system to collect usage data relating to attached peripheral devices. In either case, the operation data for each peripheral device operatively coupled to the information handling system may be transmitted to a peripheral device management system in a backend information handling system. The peripheral devices management system may operate a peripheral devices management service for users or enterprises to provide for active management and replacement of peripheral devices owned and used by client information handling systems of the user or enterprise subscriber. The peripheral device management system may maintain an account for a user or enterprise subscriber to provide for notification and replacement of peripheral devices attached to an information handling system or information handling systems throughout an enterprise to avoid surprise breakage and delays or to maximize peripheral device selections to meet usage needs. This enables subscriber users or enterprises to maintain sustainability of peripheral devices under such management. Many of the peripheral devices are "dumb" devices with limited processing and storage, so tracking of usage and ownership may occur via client information handling systems that attach with such peripheral devices. In some cases, peripheral devices may have varying degrees of "intelligence" or processing capability and may operate, in whole or in part, the peripheral devices reporting module to report usage data in whole or in part directly to a back-end peripheral device management system. The peripheral device management system may analyze the usage and operation data and provide recommendations to the information handling system, i.e., the user or IT manager thereof, with respect to the peripheral devices operatively coupled to the information handling system. These recommendations may assist the user of the information handling system or the enterprise to effectively manage the peripheral devices operatively coupled to the information handling system. In some embodiments, the subscription may provide an ongoing replacement or repair service for peripheral devices as peripheral device health status or peripheral device lifecycle status is determined.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, mobile device (e.g., personal digital assistant (PDA) or smart phone), server (e.g., blade server or rack server), a consumer electronic information handling system, a network server or storage device, a network router, switch, or bridge, wireless router, or other network communication information handling system, a network connected device (cellular telephone, tablet information handling system, etc.), IoT computing device, wearable computing device, a set-top box (STB), a mobile device, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic information handling systems that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g., random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as various input and output (I/O) devices 110, such as a keyboard, a mouse, a video/graphic display 112, other peripheral devices according to embodiments herein, or any combination thereof. For example, peripheral devices may further include audio speakers, a docking station, a monitor, a digital camera, a joystick, a microphone, a headset, a projector, a printer, a plotter, a scanner, an external hard drive, or a combination thereof. The information handling system can also include one or more buses operable to transmit communications between the various hardware components. Portions of an information handling system may themselves be considered information handling systems.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic, embedded controller 135 or some combination of the same. Any of the processing resources may operate to execute code that is either firmware or software code 124. In example embodiments, information handling system 100 may operate as a backend information handling system to manage peripheral devices as a service for a user or enterprise and execute code 124 of a peripheral devices management system 150. In other example embodiments, information handling system 100 may operate as a client information handling system for which peripheral device management is provided and execute code 124 of a peripheral devices reporting module 160. Moreover, the information handling system 100 can include memory such as main memory 104, static memory 106, computer readable medium 122, or drive unit 116 storing instructions 124. Memory may include volatile memory (e.g., random-access memory, etc.) or nonvolatile memory (read-only memory, flash memory etc.) or any combination thereof. The information handling system 100 can also include one or more buses 108 operable to transmit communications between the various hardware components such as any combination of various input and output (I/O) devices.

As shown, the information handling system 100 may further include a video display device 112. The video display device 112 in an embodiment may function as a liquid crystal display (LCD), an organic light emitting diode (OLED), a flat panel display, or a solid-state display. Additionally, the information handling system 100 may include an alpha numeric input device, such as a keyboard, and/or a cursor control device, such as a mouse, touchpad, or gesture or touch screen input device among other input devices.

The network interface device 120 may be a wired network interface device or may include a wireless interface adapter 120 which can provide connectivity to a network 144, e.g., a wide area network (WAN), a local area network (LAN), wireless local area network (WLAN), a wireless personal area network (WPAN), a wireless wide area network (WWAN), or another network. In an embodiment, the WAN, WWAN, LAN, and WLAN may each include an access point used to operatively coupled the information handling system 100 to a network. In a specific embodiment, the network 144 may include macro-cellular connections via one or more base stations 162 or WLAN or small cell connections via wireless access points 160 (e.g., Wi-Fi or WiGig), or such as through licensed or unlicensed WWAN small cell base stations.

Connectivity may be via wired or wireless connection. Network interface device 120 including a wireless interface adapter may include one or more radio frequency subsystems 130 with transmitter/receiver circuitry, modem circuitry, one or more radio frequency front end circuits, one or more wireless controller circuits, amplifiers, antenna systems 132 and other circuitry of the radio frequency subsystem 130 such as one or more antenna ports used for wireless communications via multiple radio access technologies. Each radio frequency subsystem 130 may communicate with one or more wireless technology protocols. The radiofrequency subsystem 130 may contain individual subscriber identity module (SIM) profiles for each technology service provider and their available protocols for any operating subscriber-based radio access technologies such as cellular LTE communications.

The network interface device 120, also known as a wireless interface adapter or wireless interface device, may also include antenna systems 132 which may include any number of tunable antenna systems for use with the system and methods disclosed herein. Additional antenna system modification circuitry (not shown) may also be included with the wireless interface adapter to implement coexistence control measures via an antenna controller 134 as described in various embodiments of the present disclosure.

In some aspects of the present disclosure, the wireless interface adapter of network interface device 120 may operate two or more wireless links. In a further aspect, the wireless interface adapter of network interface device 120 may operate the two or more wireless links with a single, shared communication frequency band such as with the 5G standard relating to unlicensed wireless spectrum for small cell 5G operation or for unlicensed Wi-Fi WLAN operation in an example aspect. For example, 2.4 GHz/2.5 GHz or 5 GHz wireless communication frequency bands may be apportioned under the 5G standards for communication on either small cell WWAN wireless link operation or Wi-Fi WLAN operation. In some embodiments, the shared, wireless communication band may be transmitted through one or a plurality of antennas or antennas may be capable of operating at a variety of frequency bands.

The wireless interface adapter of network interface device 120 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, or similar wireless standards may be used. Wireless interface adapter of network interface device 120 may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac/ax (e.g., center frequencies between 5.170-7.125 GHz). WLAN, for example, may operate at a 2.4 GHz band, 5 GHz band, and/or a 6 GHz band according to, for example, Wi-Fi, Wi-Fi 6, or Wi-Fi 6E standards. WWAN may operate in a number of bands, some of which are proprietary but may include a wireless communication frequency band. For example, low-band 5G may operate at frequencies similar to 4G standards at 600-850 MHz. Mid-band 5G may operate at frequencies between 2.5 and 3.7 GHz. Additionally, high-band 5G frequencies may operate at 25 to 39 GHz and even higher. In additional examples, WWAN carrier licensed bands may operate at the new radio frequency range 1 (NRFR1), NFRF2, bands, and other known bands. Each of these frequencies used to communicate over the network 144 may be based on the radio access network (RAN) standards that implement, for example, eNodeB or gNodeB hardware connected to mobile phone networks (e.g., cellular networks) used to communicate with the information handling system 100. In the example embodiment, mobile device 100 may also include both unlicensed wireless RF communication capabilities as well as licensed wireless RF communication capabilities. For example, licensed wireless RF communication capabilities may be available via a subscriber carrier wireless service operating the cellular networks. With the licensed wireless RF communication capability, a WWAN RF front end of the information handling system 100 may operate on a licensed WWAN wireless radio with authorization for subscriber access to a wireless service provider on a carrier licensed frequency band.

The wireless interface adapter of network interface device 120 can represent an add-in card, wireless network interface module that is integrated with a main board of the information handling system or integrated with another wireless network interface capability, or any combination thereof. In an embodiment the wireless interface adapter of network interface device 120 may include one or more radio frequency subsystems 130 including transmitters and wireless controllers for connecting via a multitude of wireless links. In an example embodiment, an information handling system may have an antenna system transmitter for 5G small cell WWAN, Wi-Fi WLAN or WiGig connectivity and one or more additional antenna system transmitters for macro-cellular communication. The radio frequency subsystems 130 include wireless controllers such as antenna controller 134 to manage authentication, connectivity, communications, power levels for transmission, buffering, error correction, baseband processing, and other functions. Radiofrequency subsystems may transceive wireless signals via an antenna front end 125 to antenna systems 132 for establishing wireless links with base stations or access points in network 144

The information handling system 100 may further include a power management unit (PMU) 118 (a.k.a. a power supply unit (PSU)). The PMU 118 may manage the power provided to the components of the information handling system 100 such as the processor 102, a cooling system, one or more drive units 116, a graphical processing unit (GPU), a video/ graphic display device or other input/output devices 110, and other components that may require power when a power button has been actuated by a user. In an embodiment, the PMU 118 may monitor power levels and be electrically coupled to the information handling system 100 to provide this power and coupled to bus 108 to provide or receive data or instructions. The PMU 118 may regulate power from a power source such as a battery 126 or A/C power adapter 128. In an embodiment, the battery 126 may be charged via the A/C power adapter 128 and provide power to the components of the information handling system 100 when A/C power from the A/C power adapter 128 is removed.

Information handling system 100 includes one or more of an operating system (OS) 138, and basic input/output system (BIOS) firmware/software 136 or application programs that may be executable instructions 124 executed at any processor 102 and stored at one or more memory devices 104, 106, or 116. BIOS firmware/software 136 functions to initialize information handling system 100 on power up, to launch an OS 138, and to manage input and output interactions between the OS 138 and the other elements of information handling system 100. BIOS firmware/software may, in whole or in part, be initiated and executed by an embedded controller (EC) 135 in some embodiments. EC 135 may also conduct background instructions for background functions of the information handling system 100 including health monitoring of the information handling system via a device management system such as a Dell Optimizer® system. In some embodiments, the EC 135 may coordinate peripheral device usage data collection and storage in an encrypted memory partition in static memory 106 or drive unit 116. EC 135 in some embodiments may also coordinate ongoing or periodic communications via an out of band (OOB) communication on a wireless link such as Wi-Fi with a backend information handling system to report health data on the information handling system or even peripheral device usage data pursuant to a peripheral devices reporting module 160 when information handling system 100 operates as a client information handling system. In other embodiments, peripheral device usage data collection by peripheral devices reporting module may be transmitted to a back end peripheral device management system via any telemetry reporting platform, such as Dell® Telemetry Platform, according to embodiments herein. The telemetry reporting platform may utilize OOB communications or may operate via standard wired or wireless connection on network interface device 120 to report data to a back-end information handling system executing a peripheral devices management system to administer peripheral device management services.

In a particular embodiment, BIOS firmware/software 136 resides in memory 104, and include machine-executable code that is executed by processor 102 to perform various functions of information handling system 100 as described herein. In another embodiment (not illustrated), application programs and BIOS firmware/software 136 reside in another storage medium of information handling system 100. For example, application programs and BIOS firmware/software 136 can reside in drive 116, in a ROM (not illustrated) associated with information handling system 100, in an option-ROM (not illustrated) associated with various devices of information handling system 100, in a storage system (not illustrated) associated with network channel of a wireless interface adapter 120, in another storage medium of information handling system 100, or a combination thereof. Executable code instructions 124 for application programs and BIOS firmware/software 136 can each be implemented as single programs, or as separate programs carrying out the various features as described herein.

As shown in FIG. 1, the information handling system 100 may further include a BIOS 140. As described in greater detail below, the BIOS 140 may operate the peripheral devices reporting module 160 that may be used to collect information related to the use and operation of each peripheral device operatively coupled to the information handling system 100. In an embodiment, the information related to the use and operation of each peripheral device operatively coupled to the information handling system 100 may be used to manage each peripheral device that is operatively coupled to the information handling system 100.

In an embodiment, the information handling system 100 may connect to an external wireless network 144. In particular, the wireless network 144 may have a wireless mesh architecture in accordance with mesh networks described by the wireless data communications standards or similar standards in some embodiments but not necessarily in all embodiments. The wireless interface adapter of network interface device 120 may connect to the external wireless network 144 via a WPAN, WLAN, WWAN or similar wireless switched Ethernet connection in some embodiments. The wireless data communication standards set forth protocols for communications and routing via access points, as well as protocols for a variety of other operations. Other operations may include handoff of client devices moving between nodes, self-organizing of routing operations, or self-healing architectures in case of interruption.

In some embodiments, software, firmware, dedicated hardware implementations such as application specific integrated circuits, programmable logic arrays and other hardware information handling systems can be constructed to implement one or more of the methods described herein. Applications that may include the apparatus and systems of various embodiments can broadly include a variety of electronic and computer systems. One or more embodiments described herein may implement functions using two or more specific interconnected hardware modules or information handling systems with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions, parameters, and profiles 124 or receives and executes instructions, parameters, and profiles 124 responsive to a propagated signal; so that a device connected to a network 128 can communicate voice, video or data over the wireless network 144. Further, the instructions 124 may be transmitted or received over the wireless network 144 via the network interface device, i.e., the wireless interface adapter 120.

The wireless interface adapter of the network interface device 120 may represent a network interface card (NIC) disposed within information handling system 100, on a main circuit board of the information handling system, integrated onto another component such as processor 102, in another suitable location, or a combination thereof. The network interface device 120 can include another information handling system, a data storage system, another network, a grid management system, another suitable resource, or a combination thereof. In an embodiment, the network interface device 120 may operably connect to the network 144. The connection to network 144 may be wired or wireless.

The network interface device 120 shown with a wireless interface adapter can provide connectivity to the network 144, such as a wide area network (WAN), a local area network (LAN), wireless local area network (WLAN), a wireless personal area network (WPAN), a wireless wide area network (WWAN), or another network. Connectivity may be via wired or wireless connection. The wireless interface adapter 120 may include an adaptive massive MIMO Multiplexer with transmitter/receiver circuitry, wireless controller circuitry, amplifiers and other circuitry for wireless communications. The wireless interface adapter of network interface device 120 may also include antenna systems 132 as described above which may be tunable antenna systems for use with the system and methods disclosed in the embodiments herein. The antenna controller 134 may also include wireless controllers to manage authentication, connectivity, communications, power levels for transmission, buffering, error correction, baseband processing, and other functions of the wireless interface adapter.

The information handling system 100 can include a set of instructions 124 that can be executed to cause the computer system to perform any one or more of the methods or computer-based functions disclosed herein. For example, instructions 124 may execute the peripheral device management system 150 on a backend information handling system, peripheral devices reporting module 160 on a client information handling system, various software applications, software agents, or other aspects or components. Various software modules comprising application instructions 124 may be coordinated by an operating system (OS), and/or via an application programming interface (API). An example operating system may include Windows®, Android®, and other OS types known in the art. Example APIs may include Win 32, Core Java API, or Android APIs.

The disk drive unit 116 and may include a computer-readable medium 122 in which one or more sets of instructions 124 such as software can be embedded to be executed by the processor 102 and antenna controller 134 to perform the processes described herein. Similarly, main memory 104 and static memory 106 may also contain a computer-readable medium for storage of one or more sets of instructions, parameters, or profiles 124. One or more encryption systems, via for example a trusted platform module, to encrypt peripheral device identification data and usage data in memory partitions in static memory 106 or disk drive unit 116 for later reporting via transmission to a back end peripheral device management system 150. The disk drive unit 116 or static memory 106 also contain space for data storage relating to other operations of information handling system 100. Further, the instructions 124 may embody one or more of the methods or logic as described herein. In a particular embodiment, the instructions, parameters, and profiles 124 may reside completely, or at least partially, within the main memory 104, the static memory 106, and/or within the disk drive 116 during execution by the processor 102 or an antenna controller 134 of information handling system 100. The main memory 104 and the processor 102 also may include computer-readable media.

Main memory 104 or other memory of the embodiments described herein may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The peripheral devices reporting module 150 on a client information handling system 100 may generate OS service logs in encrypted memory partitions for storage of peripheral device usage data for telemetry of active usage of features (keys, buttons, etc.) and time of usage for peripheral devices in static memory 106 or the drive unit 116 may include access to encrypted portions of a computer-readable medium 122 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a standalone device). The system, device, controller, or module can include software, including firmware embedded at a device, such as an Intel® Core class processor, ARM® brand processors, Qualcomm® Snapdragon processors, or other processors and chipsets, or other such devices, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
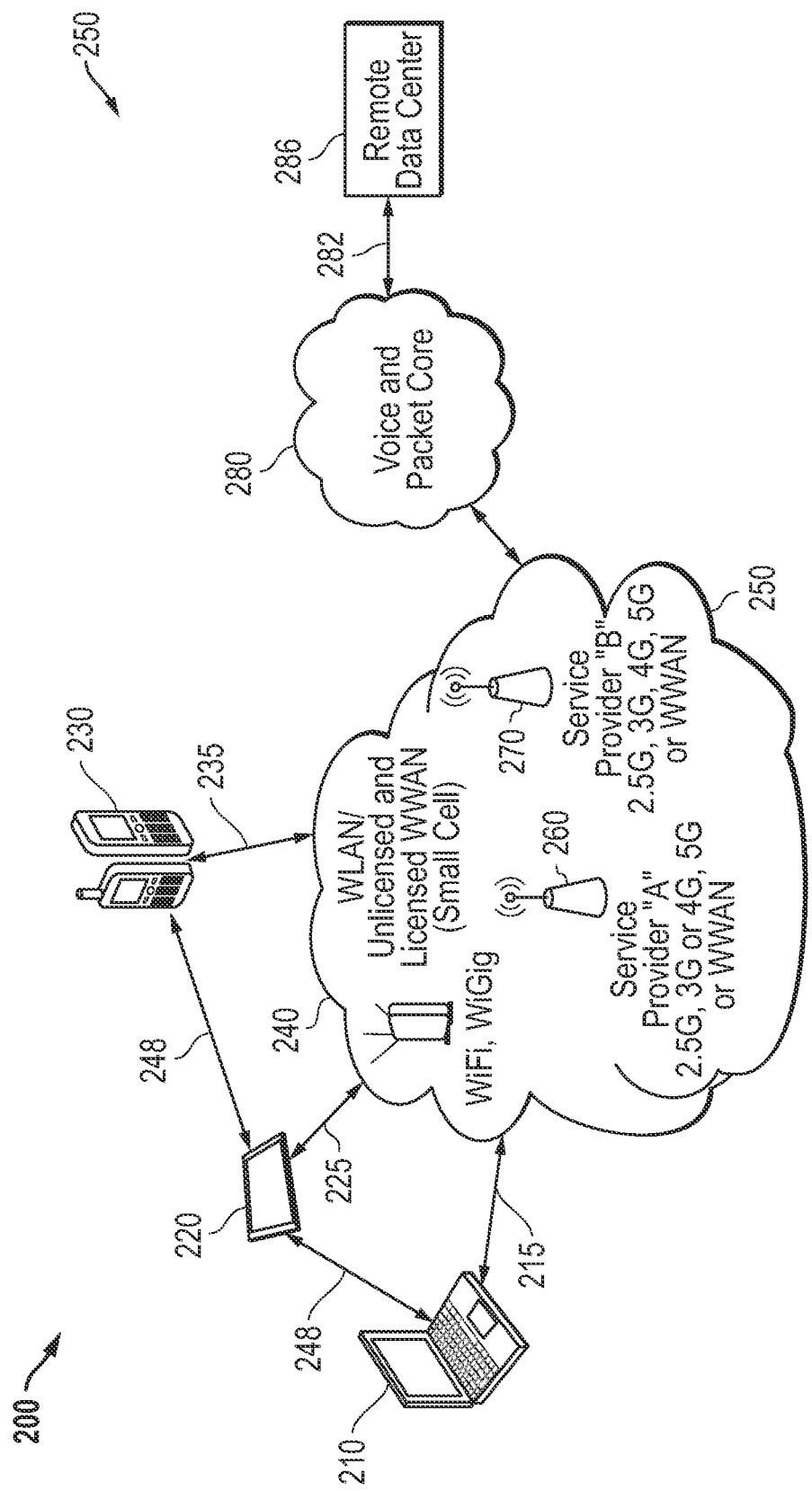
FIG. 2 is a block diagram of a network environment offering several communication protocol options and mobile information handling systems according to an embodiment of the present disclosure.

FIG. 2 illustrates a network 200 that can include one or more information handling systems 210, 220, 230. The information handling systems 210, 220, 230 shown in FIG. 2 may be similar to the information handling system 100 described in connection with FIG. 1. In a particular embodiment, network 200 includes networked mobile devices 210, 220, and 230, wireless network access points, and multiple wireless connection link options. A variety of additional computing resources of network 200 may include client mobile devices, data processing servers, network storage devices, local and wide area networks, or other resources as needed or desired. As partially depicted, information handling systems 210, 220, 230 may be a laptop computer, tablet computer, 360-degree convertible systems, wearable computing devices, or a smart phone device. These mobile devices 210, 220, and 230, may access a wireless local network 240, or they may access a macro-cellular network 250. For example, the wireless local network 240 may be available through an access point 245 and may operate a wireless local area network (WLAN), a wireless personal area network (WPAN), or a wireless wide area network (WWAN). The access point 245 may be a WLAN access point for Wi-Fi communications in an embodiment. In an example embodiment, LTE-LAA WWAN may operate with a small-cell WWAN wireless access point option.

Since WPAN or Wi-Fi Direct Connection 248 and WWAN networks can functionally operate similar to WLANs, they may be considered as wireless local area networks (WLANs) for purposes herein. Components of a WLAN may be connected by wireline or Ethernet connections to a wider external network such as a voice and packet core 280. For example, wireless network access points 245 or base stations 260, 270 may be connected to a wireless network controller and an Ethernet switch. Wireless communications across wireless local network 240 may be via standard protocols such as IEEE 802.11 Wi-Fi, IEEE 802.11ad WiGig, IEEE 802.15 WPAN, IEEE 802.11ax-2021, (e.g., Wi-Fi 6 and 6E, 6GHz technologies), or emerging 5G small cell WWAN communications such as gNodeB, eNodeB, or similar wireless network protocols and access points. Alternatively, other available wireless links within network 200 may include macro-cellular connections 250 via one or more service provider base stations 260 and 270.

As described herein, a plurality of antennas may be operatively coupled to any of the macro-cellular connections 250 via one or more service providers or to the wireless local area networks (WLANs) selectively based on the SAR data, RSSI data, configuration data, system operation and connection metrics, and antenna mounting locations (e.g., spatial locations within the information handling system) associated with each information handling systems 210, 220, 230 as described herein. Service provider macro-cellular connections may include 2G standards such as GSM, 2.5G standards such as GSM EDGE and GPRS, 3G standards such as W-CDMA/UMTS and CDMA 2000, 4G standards, or emerging 5G standards including WiMAX, LTE, and LTE Advanced, LTE-LAA, small cell WWAN, and the like.

Wireless local network 240 and macro-cellular network 250 may include a variety of licensed, unlicensed or shared communication frequency bands as well as a variety of wireless protocol technologies ranging from those operating in macrocells, small cells, picocells, or femtocells. As described herein, utilization of RF communication bands according to several example embodiments of the present disclosure may include bands used with the WLAN standards and WWAN carriers which may operate in both licensed and unlicensed spectrums. Each of these frequencies used to communicate over the network 144 may be based on the radio access network (RAN) standards that implement, for example, eNodeB or gNodeB hardware connected to mobile phone networks (e.g., cellular networks) used to communicate with the information handling system 100. In the example embodiment, mobile device 100 may also include both unlicensed wireless RF communication capabilities as well as licensed wireless RF communication capabilities. For example, licensed wireless RF communication capabilities may be available via a subscriber carrier wireless service operating the cellular networks. With the licensed wireless RF communication capability, an WWAN RF front end of the information handling system 100 may operate on a licensed WWAN wireless radio with authorization for subscriber access to a wireless service provider on a carrier licensed frequency band. WLAN such as Wi-Fi (e.g., Wi-Fi 6) may be unlicensed.

In some embodiments according to the present disclosure, a networked mobile device 210, 220, or 230 may have a plurality of wireless network interface systems capable of transmitting simultaneously within a shared communication frequency band. That communication within a shared communication frequency band may be sourced from different protocols on parallel wireless network interface systems or from a single wireless network interface system capable of transmitting and receiving from multiple protocols. Similarly, a single antenna or the plurality of antennas in each information handling system 210, 220, 230 may be used on each of the wireless communication devices such as according to embodiments herein and may be suited to plural RF bands. Example protocols may be local wireless network access protocols such as Wi-Fi/WLAN, WiGig, and small cell WWAN in an unlicensed, shared communication frequency band and macro-cellular network access protocols such as WWAN protocols on licensed bands. In other embodiments, mobile devices 210, 220, or 230 may have wired network connections to voice or packet core 250 via a network interface device in some embodiments.

The voice and packet core network 280 shown in FIG. 2 may contain externally accessible computing resources and connect to a remote data center 286. The voice and packet core network 280 may contain multiple intermediate web servers or other locations with accessible data (not shown).

The voice and packet core network 280 may also connect to other wireless networks similar to 240 or 250 and additional mobile devices such as 210, 220, 230 or similar connected to those additional wireless networks. Connection 282 between the wireless network 240 and remote data center 286 or connection to other additional wireless networks may be via Ethernet or another similar connection to the world-wide-web, a WAN, a LAN, another WLAN, or other network structure. Such a connection 282 may be made via a WLAN access point/Ethernet switch to the external network and be a backhaul connection. The access point may be connected to one or more wireless access points in the WLAN before connecting directly to a mobile device or may connect directly to one or more mobile devices 210, 220, and 230. Alternatively, mobile devices 210, 220, and 230 may connect to the external network via base station locations at service providers such as 260 and 270. These service provider locations may be network connected via backhaul connectivity through the voice and packet core network 280.

Remote data centers 286 may include web servers or resources within a cloud environment that operate via the voice and packet core 280 or other wider internet connectivity. For example, remote data centers can include additional information handling systems, data processing servers, network storage devices, local and wide area networks, or other resources as needed or desired. Having such remote capabilities may permit fewer resources to be maintained at the mobile devices 210, 220, and 230 allowing streamlining and efficiency within those devices. Similarly, remote data center permits fewer resources to be maintained in other parts of network 200.

In a particular aspect, the remote data center 286 may include peripheral device management server executing a peripheral device management system to administer peripheral device management services for a user or enterprise. The peripheral device management system may receive reporting data on identification of peripheral devices and attached client information handling systems 210, 220, or 230 as well as usage data describing peripheral device utilization according to embodiments herein. Client information handling systems 210, 220, or 230 may execute code instructions of a peripheral devices reporting module to collect, encrypt, and report the client information handling system and attached peripheral devices identifying information and collected usage data for the peripheral devices to the peripheral device management system. In some embodiments, the peripheral devices themselves with varying degrees of processing capability may report some usage data to the remote data center 286 and peripheral device management system.

Although 215, 225, and 235 are shown connecting wireless adapters of mobile devices 210, 220, and 230 to wireless networks 240 or 250, a variety of wireless links are contemplated. Wireless communication may link through a wireless access point (Wi-Fi or WiGig), through unlicensed WWAN small cell base stations such as in network 240 or through a service provider tower and base stations such as that shown with service provider A 260 or service provider B 270 and in network 250. In other aspects, mobile devices 210, 220, and 230 may communicate intra-device via 248 when one or more of the mobile devices 210, 220, and 230 are set to act as an access point or even potentially an WWAN connection via small cell communication on licensed or unlicensed WWAN connections. For example, one of mobile devices 210, 220, and 230 may serve as a Wi-Fi hotspot in an embodiment. Concurrent wireless links to information handling systems 210, 220, and 230 may be connected via any access points including other mobile devices as illustrated in FIG. 2.

Figure 3:
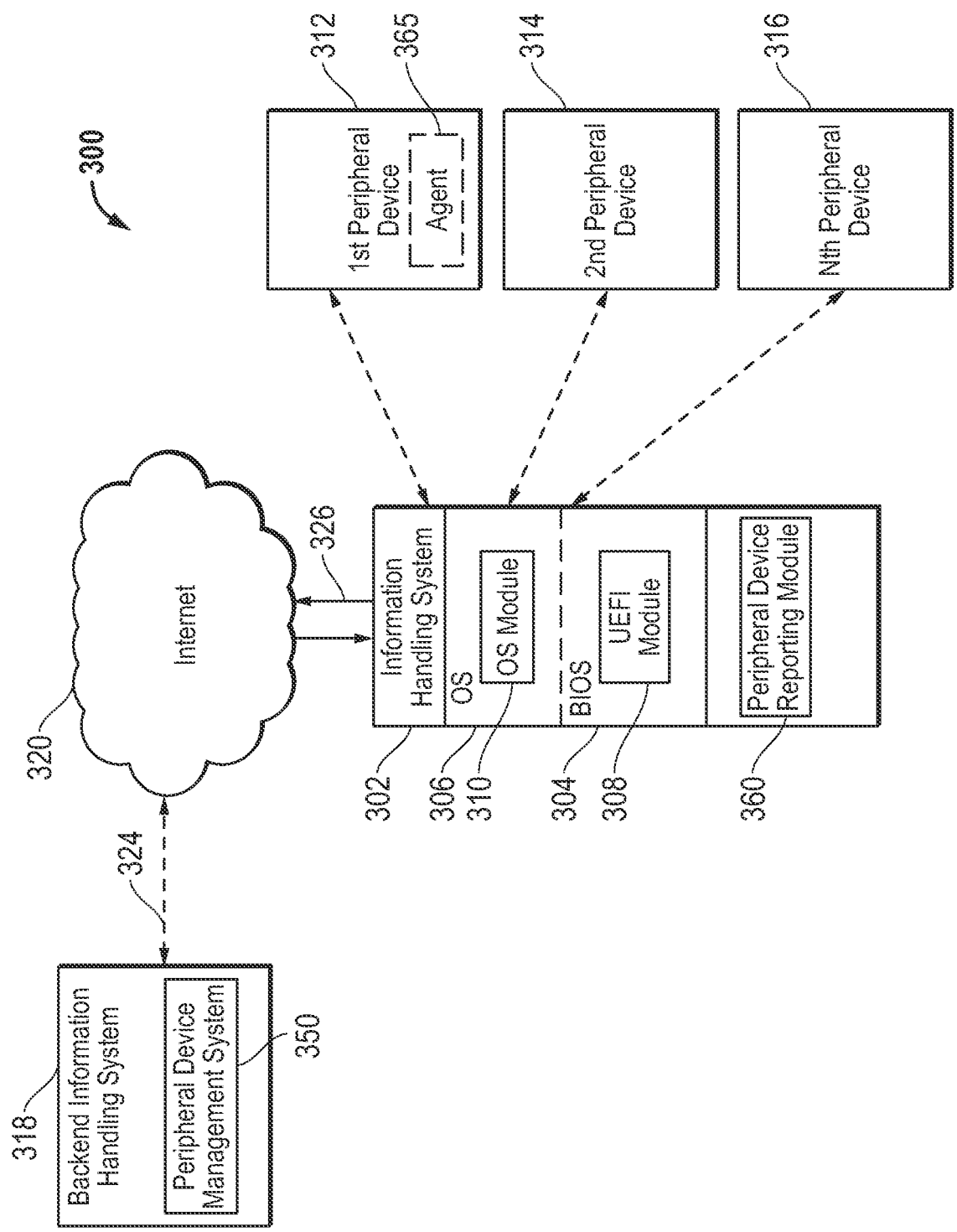
FIG. 3 is a block diagram of a network system with peripheral device management service according to an embodiment of the present disclosure.

Referring now to FIG. 3, a system for peripheral device management according to an embodiment is illustrated and is generally designated 300. As shown, the system 300 may include an information handling system 302 which may be a client information handling system. The information handling system 302 may include one or more of the same elements as the information handling system 100 illustrated in FIG. 1. As illustrated, in this particular embodiment, the information handling system 100 may include a basic input/output system (BIOS) 304 and an operating system (OS) 306. As is known in the art, the BIOS 304 is firmware that may be used to perform hardware initialization during the booting process (i.e., startup after the information handling system 302 is powered on). The BIOS 304 may also provide runtime services for the OS 306 and programs operating within the information handling system 302. The OS 306 may be system software that may manage computer hardware and software resources. The OS 306 may also provide common services for computer programs operating within the information handling system 302.

In an embodiments as shown a peripheral device reporting module 360 may operate with BIOS 304 and OS 306 to collect peripheral device identification and usage data and to prepare a secure manifest of the same data for transmission to a back-end information handling system 318 executing a peripheral device management system 350 to administer peripheral device management services. The peripheral device reporting module 360 may utilize a unified extensible firmware interface (UEFI) module 308 in BIOS or an OS module 310 in OS to collect such identification and usage data for peripheral devices 312, 314, 316.

In an embodiment, the BIOS 304 may include the UEFI module 308. In a particular embodiment, according to the present disclosure, the UEFI 308 may be used to passively collect information regarding one or more peripheral devices 312, 314, 316 operatively coupled to the information handling system 302. In a passive collection regarding identification and usage data for peripheral devices 312, 314, 316, the UEFI module may store a list of connected peripheral devices 312, 314, 316 and how they are connected upon every boot up of the client information handling system 302 and may write some usage data, for example how often used or connected, to logs stored in an encrypted partition in memory. The encrypted list of connected peripheral devices 312, 314, 316 may be associated with a device identification of the client information handling system 302 to which they are attached such as via a digital device identification (DDID) or serial number of the client information handling system 302. A DDID may be a unique identifier for the client information handling system 302 and may utilized a device serial number as well a combination of components, their serial numbers, software or revisions, or other unique features of the client information handling system to generate the DDID and distinguish it from other information handling systems. Such unique information and the generated DDID may be known to a manufacturer of the information handling system and may be provided to a peripheral device management system for use in identifying a client information handling system 302. Similarly, serial numbers of the peripherals devices 312, 314, 316 or other available identifying data of operatively coupled peripheral devices 312, 314, 316 may be stored in the peripheral device logs at the encrypted partition.

The OS 306 may include an OS module 310 that may be used to actively collect information regarding one or more peripheral devices 312, 314, 316 operatively coupled to the information handling system 302. For example, the OS module 310 may utilize the peripheral device logs in the encrypted memory partition to utilize OS service logs through a management interface, such as Window® management interface, to collect and log actions of the peripheral devices 312, 314, 316 such as number of keystrokes, number of clicks, hours of usage, levels of usage such as power levels or brightness, number of scans or executions, lags, retries, errors, or similar usage data and operational data. The OS module 310 may pull identity, serial numbers and telemetry or metadata from operatively coupled peripheral devices 312, 314, 316 to store in the same partition and peripheral device logs established in the encrypted partition of memory as the UEFI module 308 creating the list of peripheral devices 312, 314, 316 upon boot up in an embodiment.

This active and passive identification usage data is collected by a peripheral device reporting module 360 with the OS module 310 and the UEFI module 310 and peripheral device serial numbers are associated in the logs of the user/client device information handling system 302 device identification which may use client information handling system 302 serial number or digital device identification (DDID) to generate a manifest of the peripheral devices 312, 314, 316. The manifest of serial numbers of peripheral devices 312, 314, 316 and client information handling system serial number or DDID may be encrypted via signing with a trusted platform module (TPM) key. Upon transmission of the manifest of serial numbers of peripheral devices 312, 314, 316 and client information handling system device identification (e.g., serial number or DDID) to the backend server, the manifest may be associated to a customer account for the user or enterprise by the peripheral device management system 350.

As illustrated in FIG. 3, the network system 300 may include a first peripheral device 312 operatively coupled to the information handling system 302. In an embodiment, a second peripheral device 314 may be operatively coupled to the information handling system 302. Moreover, an Nth peripheral device 316 may be operatively coupled to the information handling system 302. In an embodiment, the peripheral devices 312, 314, 316 may include any combination of the following devices: a keyboard, a mouse, a display, audio speakers, a docking station, a monitor, a digital camera, a joystick, a microphone, a headset, a projector, a printer, a plotter, a scanner, and an external hard drive. Further, the peripheral devices 312, 314, 316 may be operatively coupled to the information handling system 302 via a wired connection, a wireless connection, or a combination thereof. In particular, the peripheral devices 312, 314, 316 may be operatively coupled to the information handling system 302 via a universal serial bus (USB) connection, a Lightning connection, a FireWire connection, a Thunderbolt, an external serial AT attachment (eSATA) connection, a parallel port, a serial port, a small computer system interface (SCSI) connection, a Bluetooth connection, a Wi-Fi connection, 5G small cell connection, or a combination thereof.

As further illustrated in FIG. 3, the information handling system 302 may be operatively coupled to a backend information handling system 318 via the Internet 320. The information handling system 302 and the backend information handling system 320 may be operatively coupled to the Internet via respective network connections 324, 326. The network connections 324, 326 may be wireless or wired. The wired connections may be digital subscriber line (DSL), cable modem, fiber optic, or a combination thereof. Further, the wireless connections may be 2G (GSM), 2.5G (GPRS, Edge), 3G (R99, HSPA, HSPA+), 4G (LTE), 5G, WiFi, CDMA, or a combination thereof.

FIG. 3 further indicates that the backend information handling system 318 may include the peripheral device management system 350. As described in detail below and in an embodiment of the present disclosure, the peripheral device management system 350 may receive information regarding the one or more peripheral devices 312, 314, 316 operatively coupled to the information handling system 302 in a manifest transmitted to the backend information handling system 318. The manifest may be generated by the peripheral devices reporting module 360 from the UEFI module 308 or OS module 310 at the information handling system 302. The peripheral device management system 350 associates the manifest with a user or enterprise account. Further, the peripheral device management system 350 may process and review the information from the UEFI module 308 or OS module 310 in order to make recommendations to an enterprise IT manager or a user of the information handling system 302 regarding each of the one or more peripheral devices based on how each peripheral device is being used. In some embodiments, peripheral devices 312, 314, and 316 may include a particular level of processing and memory and may execute their own agent 365 of the peripheral device reporting module to report usage data or operational data such as lag, retries, or errors by the peripheral device. Such peripheral device reporting by agent 365 may be to the encrypted partition at client information handling system 302 in some embodiments or may be directly to backend information handling system 318 in whole or in part in other embodiments.

The peripheral device management system 350 may determine a peripheral device usage lifecycle status or a peripheral device health status. The peripheral device usage lifecycle status may be determined from comparison of cumulative usage data for an identified peripheral device 312, 314 or 316 with known usage levels or range, such as hours of operation or number of actuations of a button, key or other component, over an expected lifetime of the peripheral device 312, 314, or 316. This may include operational information such as power levels of usage, frequency of usage (e.g., number of actuations or the like) cumulatively of the peripheral device. The peripheral device health status may be determined over a defined period such as a number of boot cycles, or number of days, weeks or months, or over a number of hours of operation to assess the peripheral devices 312, 314, or 316 overuse or underuse utilization levels in an embodiment. The peripheral device utilization levels from reported usage data may be compared to typical usage levels of a similar defined period in an embodiment. Further, such utilization levels may be compared to utilization levels typical for a peripheral device in a similar stage of the known peripheral device lifecycle in other embodiments. The peripheral device health status may also be determined from reported levels of operation such as at a highest power level such as highest brightness level for a display or projector or other device versus operation a lower power level or intensity level. Peripheral device health status may also be determined from reported operational information such as reported lags, retries, errors, or the like. Reaching a threshold of lag, number or retries, errors or occurrence of a particular error may be reported as part of the peripheral device health status.

The peripheral device management system 350 may generate a peripheral device utilization report indicating peripheral device usage lifecycle status or the peripheral device health status for an IT manager or user of the information handling system 302. The peripheral device utilization report generated by the peripheral device management system 350 may also recommend an upgrade, a downgrade, a replacement, repair, etc., of a particular peripheral device. For example, a recommendation may indicate a peripheral device is nearing the end of a lifecycle or is under or over utilized and suggest decommissioning the peripheral device. Additionally, a recommendation may be made to add a new peripheral device as a replacement. An acceptance of the decommissioning or addition of a peripheral device by an IT manager or user may be also logged with an enterprise or user account by the peripheral device management system 350. In other embodiments, depending on the peripheral device management services subscription, a decommissioning, replacement addition, or a repair order, may be generated automatically. Such an order notification may be transmitted to a user or the enterprise. The peripheral device management system 350 may also make changes to the subscription cost as is necessary.

In an embodiment, the peripheral device management system 350 may generate the utilization report for transmission to an IT manager or user of information handling system 302 including utilization data indicating peripheral device usage lifecycle status or the peripheral device health status and any recommendations for peripheral devices 312, 314, and 316 and transmit that utilization report from the backend information handling system 318 via a wireless or wired link 324 and 326 to the user information handling system 302. In other embodiments, the utilization report may be transmitted directly to or additionally to an IT manager operating an information handling system 302. At the client or IT manager information handling system 302, the peripheral devices reporting module 320 may generate and display the utilization report with recommendations for viewing by the user or IT manager regarding each of the one or more peripheral devices based on how each peripheral device is being used. For example, the peripheral device management system 350 may have recommended or notified the user or IT manager of an upgrade, a downgrade, a replacement, repair, etc., of a particular peripheral device.

Figure 4A:
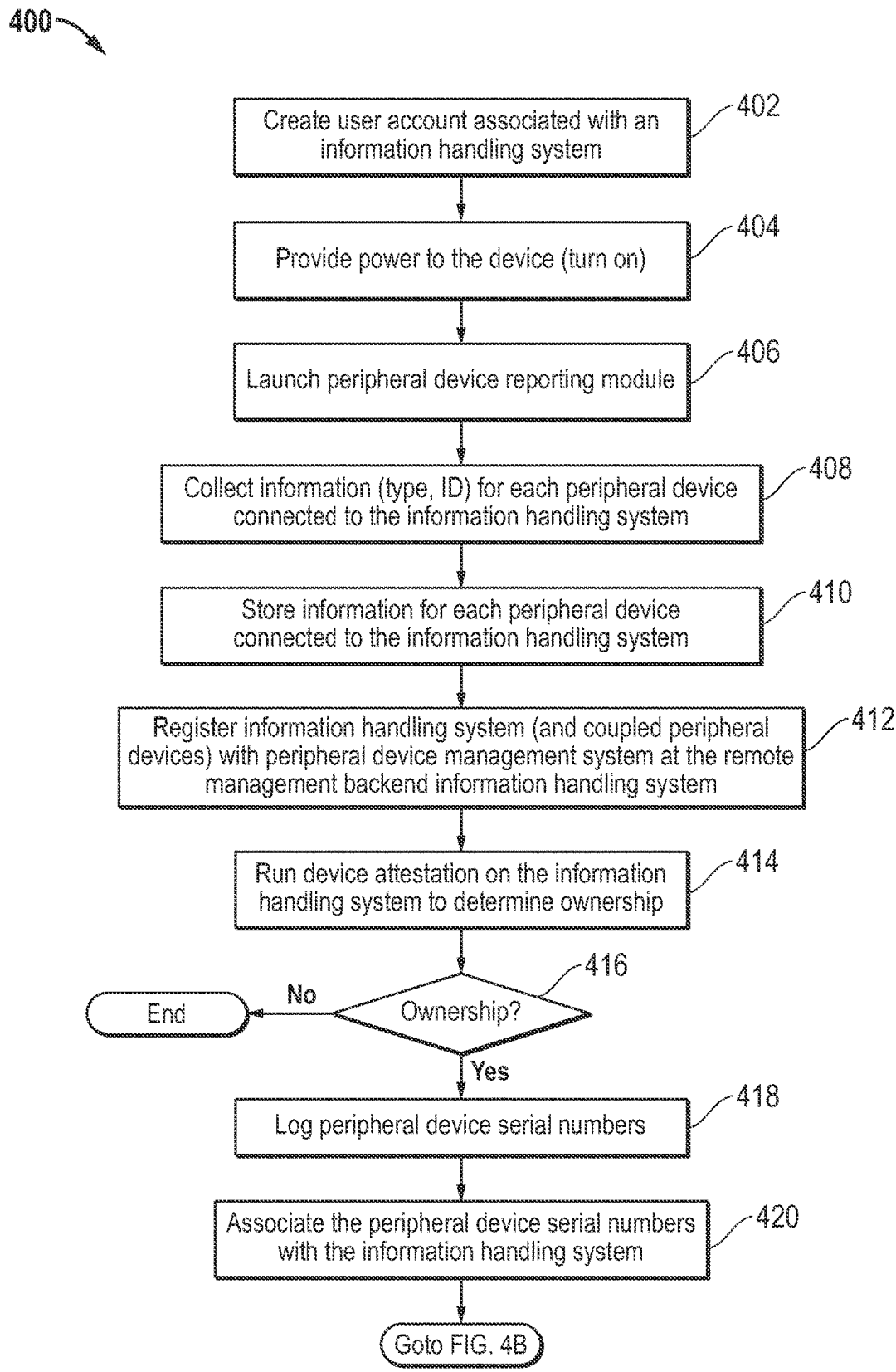
FIG. 4A is a flow diagram illustrating a first portion of a method of managing peripheral devices operatively coupled to an information handling system according to another embodiment of the present disclosure.
Figure 4B:
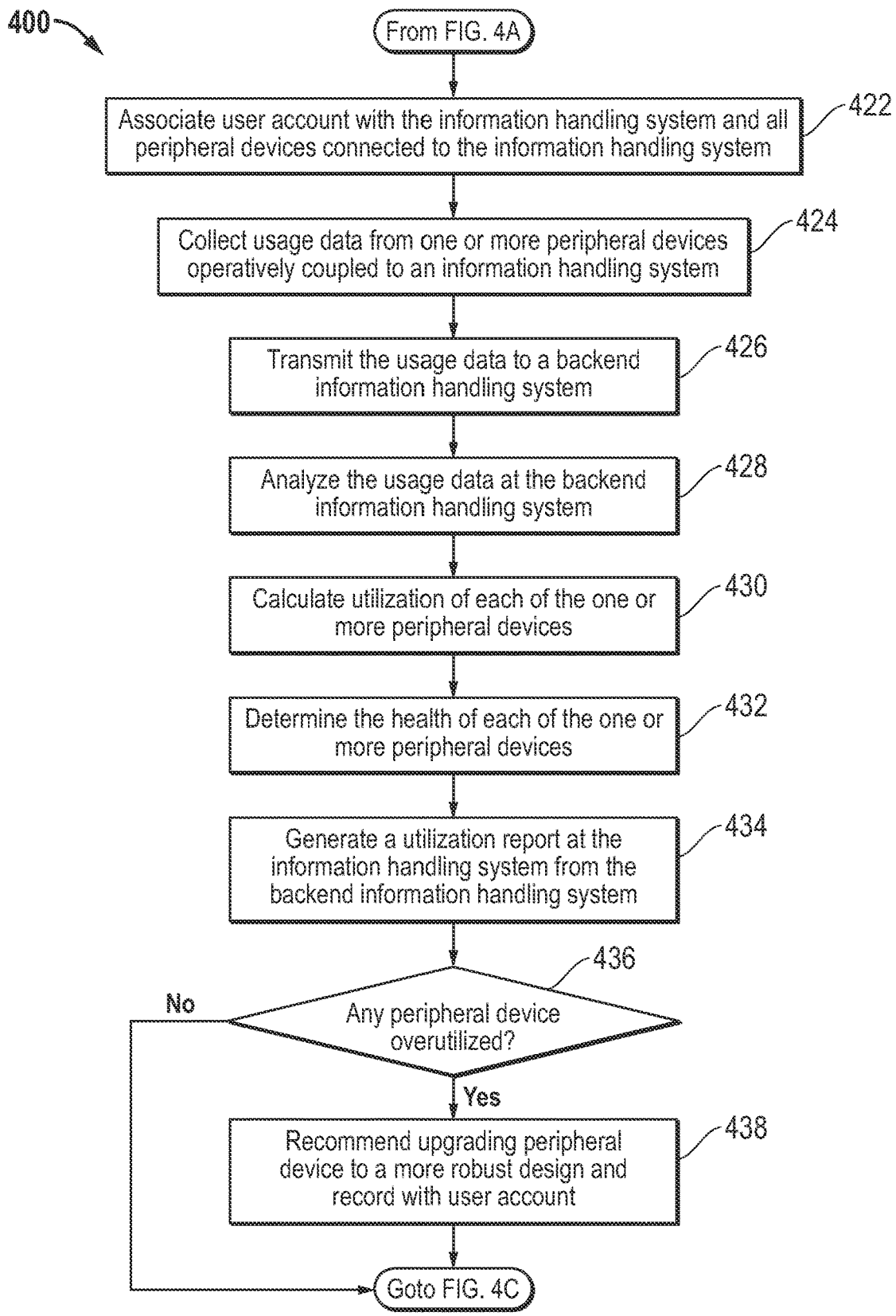
FIG. 4B is a flow diagram illustrating a second portion of a method of managing peripheral devices operatively coupled to an information handling system according to another embodiment of the present disclosure.
Figure 4C:
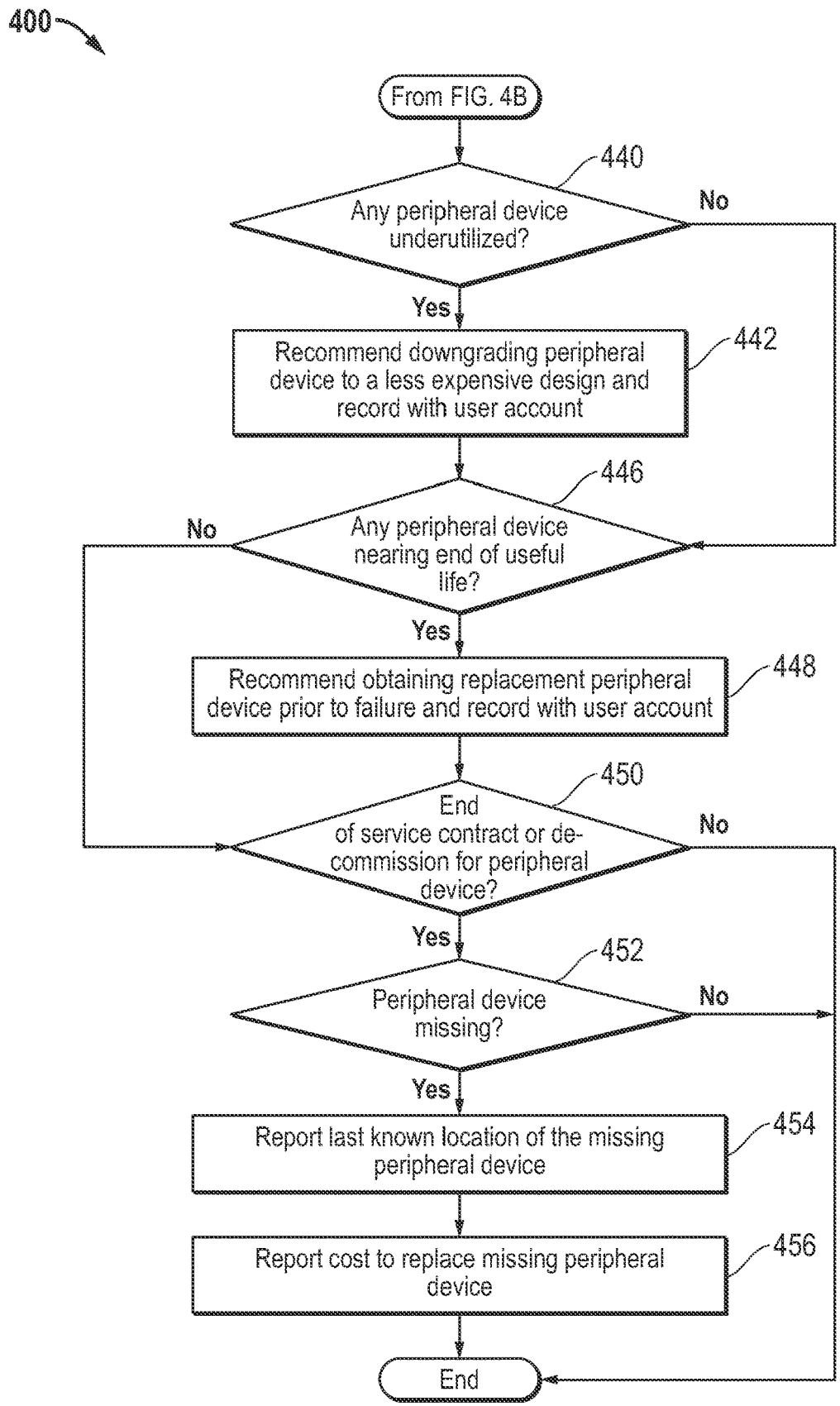
FIG. 4C is a flow diagram illustrating a third portion of a method of managing peripheral devices operatively coupled to an information handling system according to another embodiment of the present disclosure.

Referring now to FIG. 4A through FIG. 4C, a flow diagram illustrating a method of managing peripheral devices operatively coupled to an information handling system according to another embodiment of the present disclosure is disclosed and the method is generally designated 400. Commencing at block 402, the method a may create a user account associated with an information handling system. For example, the user account may be created when the information handling system is purchased and may be associated with an individual user or with an enterprise. The user account in some embodiments may reflect a service for peripheral device management. In further embodiments, the user account may reflect a subscription service for peripheral device management as well as peripheral devices as a service where upgrades, downgrades and replacements are administered and provide for a fee that may adjust depending on the level of peripheral device deployment utilized. Such a system may add to sustainability and reuse of peripheral devices, for example within an enterprise, by swapping devices with varying levels of capability with users depending on the reported usage levels indicating device overuse or underuse utilization and may determine peripheral device life expectancy for determination of replacement or repair. At block 402, the back end peripheral device management system may receive registration of a client information handling system from a user, sales organization, or an enterprise deploying a new client information handling system. The registration of the client information handling system with a user account for peripheral device management services may include the user or enterprise details and a client information handling system device identification which may include a serial number or DDID of the client information handling system participating in peripheral device management services.

At block 404, the method 400 may provide power to, or energize, the device (i.e., the device may be turned on). In one embodiment, the registration of the client information handling system with a user account for peripheral device management services may occur after first power on of the information handling system. For example, the registration information may be received at the back end peripheral device management system from a peripheral devices reporting module operating on the client information handling system. In an embodiment, the client information handling system may operate at a user's location, e.g., at a user's house or office of an enterprise. Such a location may be reported as well to the back end peripheral device management system in some embodiments.

Thereafter, at block 406, the method 400 may launch a peripheral devices reporting module. In an embodiment, the peripheral devices reporting module may include a module operating on the BIOS, e.g., the UEFI module 308 of FIG. 3. In another embodiment, the peripheral devices reporting module may include an OS module 310 running on the OS 306. At block 410, the method 400 may collect identifying information for each peripheral connected to the information handling system. The identifying information may include the device identification of the client information handling system (i.e., a serial number or a DDID), identity of each peripheral device, a serial number of each peripheral device, a type of each peripheral device, connection type for each peripheral device, or a combination thereof. It is to be understood that the peripheral devices may be operatively coupled to the information handling system via a wired connection or a wireless connection. In an embodiment, the UEFI module 308 may passively collected usage data by storing a list of connected peripheral devices on every boot and write a log of the connected peripheral devices into an encrypted partition in a memory at the information handling system. In a further embodiment, the OS module 310 may log the active usage of the peripheral devices through a management interface and store the active usage in an encrypted partition in a memory at the information handling system. For example, the OS module 310 may detect peripheral device telemetry data including usage metrics such as button clicks, taps, keystrokes and keys used, hours of operations, power or other operational intensity levels of peripheral device operation (e.g., brightness, sleep states, low-power or dormancy modes etc.), hours of operation of the peripheral device, response lags, retries, or errors attributed to the peripheral devices. This telemetry data may be actively logged as usage data showing utilization of the attached peripheral devices and associated with each peripheral device.

At block 410, the method 400 may store the identifying information and usage data retrieved for each peripheral device connected to the information handling system. For example, the identifying information for each peripheral device may be stored at a memory within the information handling system, in particular in a log of an encrypted partition in memory to establish a list of attached information handling systems. Further, the identifying information for each peripheral device may be stored within the encrypted partition of the memory within the information handling system and associated with the device identification of the client information handling system. This log in the encrypted partition of memory may also receive active telemetry data as described above as generated with the OS module after boot up as the client operating system utilizes the one or more peripheral devices. The logs of the peripheral devices with identifying information and telemetry of usage data recorded may be encrypted with the device identification of the client information handling system with the use of a TPM module to establish a manifest of peripheral devices attached to the client information handling system the encrypted partition. This peripheral device manifest may be transmitted to a back end peripheral device management system in real time or may be transmitted periodically such as after various periods of time, at log off, at boot up or at any other cadence as may be determined useful as described further in embodiments herein.

At block 412, the method 400 may register the manifest associated with the device identification for the client information handling system with the back end peripheral device management system upon transmitting the peripheral device manifest to the back-end information handling system to indicate initial or ongoing peripheral device management services for the client information handling system.

At block 414, the method 400 may, in some embodiments, may perform a device attestation on the client information handling system. In an embodiment, the device attestation may include querying the user with a list of peripheral devices that are associated with the information handling system and asking the user if they would like to confirm ownership of the list of peripheral devices operatively coupled to the information handling system. At decision 416, the method 400 determines whether the user, or enterprise, claims ownership of the peripheral devices. If not, the method 400 may end for a particular peripheral device. Conversely, if the user claims ownership at decision 416 for some or all of the peripheral devices including any newly detected peripheral devices, the method 400 may proceed to block 418. At block 418, the method 400 may log peripheral serial numbers for the currently active peripheral devices. Further, at block 420, the method 400 may associate the peripheral serial numbers of the currently active peripheral devices with the information handling system device identification in the encrypted partition memory to update the peripheral device manifest. Such an updated peripheral device manifest may be transmitted to the backend information handling system executing the peripheral device management system to conduct monitoring of the peripheral device management services.

Moving to FIG. 4B, the method 400 may continue to block 422 where the method 400 may continue with the back-end information handling system peripheral device management system associating the user account with the information handling system and all peripherals connected to the information handling system as received in the most updated peripheral device manifest from the client information handling system. It is understood that the peripheral device management system at the back end may manage peripheral devices for a plurality of client information handling systems for multiple users or among one or more enterprises. The peripheral device management system may be administered by the peripheral device management services provider and may be in coordination with services provided regarding health and lifecycle status for the client information handling system in some embodiments. In an embodiment, the manifest of the peripheral devices including a serial number or other device identification such as the DDID of the information handling system may be securely associated with the user account. For example, the manifest of the peripheral devices and the serial number of the information handling system may be signed with a trusted module platform (TPM) key. It is to be understood that the TPM key is a cryptographic key provided by a TPM that is a microcontroller designed to secure hardware through such cryptographic keys.

At block 424, the method 400 may return to the client information handling system where the peripheral devices reporting module may actively collect usage data from one or more peripheral devices operatively coupled to an information handling system during operation after boot up. In an embodiment, as described herein the usage data may be collected passively or actively. For example, passive collection may be provided by the UEFI module 308 within the BIOS 304, shown in FIG. 3 and described above. In an embodiment, the UEFI module 308 may store a list of connected peripherals and operational information, or usage information such as number of boot ups with a connected peripheral device or duration of operation, concerning the health status or lifecycle status of each connected peripheral on every boot. As described above the UEFI module 308 may write one or more logs of this information into the encrypted partition of the memory of the information handling system. In another embodiment, the usage data may be collected by the OS module 310 within the OS 306, shown in FIG. 3, of the information handling system. In particular, the OS module 310 may log the active usage of the peripherals through a management interface into an encrypted partition of the memory of the information handling system. This active usage data may include actuations of peripheral devices such as button clicks, keystrokes, gestures or swipes, mouse movements, scans, or the like as well as duration of operation such as time a display or projector operates and what levels such peripheral devices are operating at such as power levels for a mouse, peripheral touchpad, display brightness, audio volume, projector power level, headset brightness (e.g., augmented reality headset) or audio levels, or the like. Active OS logs of the usage data may be written to the encrypted partition in conjunction with client information handling system monitoring of operations such as with operation of the Dell Data Vault system and peripheral device usage data directed to peripheral device logs for establishing the peripheral device manifest as described. This active usage data of the OS module 310 may also be assessed to determine health status or lifecycle status upon transmission to the back end peripheral device management system.

Proceeding to block 426, the method 400 may transmit the usage data of the one or more peripheral devices to a backend information handling system. In an embodiment, the information handling system, e.g., the peripheral device reporting module 360 therein, may transmit the usage data to the backend information handling system via a network connection. In some embodiments, the client information handling system may operate as always connected and transmit such a manifest with updating active usage data consistently as the client information handling system operates. In other embodiments, updated peripheral device manifests may be set for transmission at any cadence such as upon boot up or login, log off, or over any time period in minutes, hours, or days.

In some embodiments, the transmission of the updated peripheral device manifests for the client information handling system may be transmitted via establishing an out of band (OOB) wireless link by the peripheral device reporting module to the back-end information handling system, such as via an EC operating with a OOB Wi-Fi wireless link to avoid burdening the processor and OS during ongoing or periodic peripheral device manifest updates to the back-end information handling system. In another embodiment, the transmission of the updated peripheral device manifests for the client information handling system may be transmitted via establishing a normal wired or wireless link by the peripheral device reporting module to the back-end information handling system, such as via the internet. In an embodiment a telemetry reporting platform, such as a Dell® Telemetry platform may be used for reporting the updated peripheral device manifest as similar to those used with Dell® information handling system remote health management system utilizing Dell® Data Vault, Dell® Optimizer, and similar systems and may include wired or wireless connectivity or even OOB connectivity to communicate with the back end peripheral device management system.

At block 428, the method 400 may analyze the usage data at the backend information handling system. For example, the usage data may be analyzed at the peripheral device management system 350 within the backend information handling system as illustrated in FIG. 3. The usage data may be analyzed to determine information about each of the peripheral devices. For example, at block 430, the method 400 may calculate the utilization of each peripheral device over a known lifecycle of the peripheral devices from the usage data and at block 432, the method 400 may determine the health of the one or more peripheral devices based on the usage data within a period of operation that may be number of boot ups, number of hours, days, or the like to determine a rate of utilization in a near-term window to determine over utilization or underutilization. Both device utilization for lifecycle and device health status may also account for operation information including intensity of operation levels or reported peripheral device functioning such as lags, retries, or errors incurred. The utilization relative to usage lifecycle may indicate how long each peripheral device is used each day and may indicate how long each peripheral device has been used since it went entered service compared to a known lifecycle of a peripheral device from the administered peripheral device management service. The health of each peripheral device may indicate whether the peripheral device is being overused or overutilized or underused or underutilized or if each peripheral device is operating properly. In a further embodiment, the health of each peripheral device may indicate whether the peripheral device is operating optimally or sub-optimally or with errors. For example, if a keyboard is exhibiting latency in response to keystrokes, or a mouse is exhibiting a lag in cursor movement it may be considered unhealthy. If an audio system is not remaining connected to the information handling system, it may be considered unhealthy.

Moving to block 434, the method 400 may generate a utilization report with the peripheral device management system at the backend information handling system. The utilization report may indicate how long or how high the level of actuations for each peripheral device is being used relative to an overall expected lifecycle or usage during a period of time in a near term and may include recommendations for each peripheral device at least based on the usage of each peripheral device as described herein. For example, at decision 436, the method 400 may determine if any peripheral device is overutilized or operating sub-optimally due to operation performance issues or errors. The peripheral device management system may assess a near-term period of time or boot ups cycles to assess usage data for time of operation, intensity of operation, intensity or levels of actuation, or other factors during the near-term period relative to typical usage levels for such a period or for such a time during a lifecycle. The peripheral device management system may assess a near-term period of time or boot ups cycles for errors or reporting of lags, retries or other sub-optimal operational data as well. If the peripheral device management system determines that the health of any peripheral device is overutilized or operating sub-optimally, the method 400 may proceed to block 438 and the peripheral device management system may recommend upgrading the peripheral device to a more robust design as part of the utilization report. [INVENTORS: ARE THERE OTHER RECOMMENDATIONS?] In an embodiment, the recommendation may be made to the user or IT manager via the transmission of the utilization report to the peripheral device reporting module on the client information handling system for review. The utilization report may be a notification of the peripheral device health status or may seek feedback from the user or IT manager to approve de-commissioning the overutilized peripheral device. In another embodiment, the utilization report may provide a notice that the overutilized, or sub-optimal, peripheral device is being decommissioned and instructions for returning the peripheral device. Further, the utilization report may recommend a replacement device, request permission to replace the peripheral device, or issue notification and instructions about a replacement device for delivery to the user of the client information handling system. The peripheral device management system may record such changes within a user or enterprise account for peripheral device management upon approval of a decommission and added device or automatically if such a swap is to occur under the peripheral management services subscription of the user or enterprise. Thereafter, the method 400 may proceed to decision 440 of FIG. 4C. Returning to decision 436, if there is not a peripheral device that is overutilized or performing sub-optimally, the method 400 may move directly to decision 440 of FIG. 4C.

At decision 440 of FIG. 4C, the method 400 may determine if any peripheral device is underutilized. If the method 400 determines that a peripheral device is underutilized, the method 400 may proceed to block 442 and the method 400 may recommend downgrading peripheral to a less expensive design in a utilization report. [INVENTORS: ARE THERE OTHER RECOMMENDATIONS?] The peripheral device management system may assess a near-term period of time or boot ups cycles to assess usage data for time of operation, intensity of operation, intensity or levels of actuation, or other factors during the near-term period relative to typical usage levels for such a period or for such a time during a lifecycle. The peripheral device management system may assess a near-term period of time or boot ups cycles for errors or reporting of lags, retries or other sub-optimal operational data as well. In an embodiment, the recommendation may be made to the user or IT manager via the utilization report and transmitted to the client information handling system peripheral device reporting module. The utilization report may notify of the underutilization, request decommissioning the underutilized peripheral device and permission to replace with a downgraded peripheral device to save cost or may automatically decommission the underutilized peripheral device and add a replacement with notification and instructions for return and replacement. The peripheral device management system may report to the user or enterprise account for peripheral device management services and adjust the account according to permission or a swap as described if applicable depending on the subscription. Thereafter, the method 400 may proceed to decision 446 of FIG. 4C. Returning to decision 440, if there are not any peripheral devices that are underutilized, the method 400 may move directly to decision 446.

At decision 446, the method 400 may determine if any peripheral device is nearing the end of the useful life for that particular peripheral device. If the method 400 determines that there is a peripheral device that is nearing the end of its useful service life cycle, the utilization report may include a peripheral device usage lifecycle status indicating the peripheral device is nearing the end of its lifecycle. The peripheral device management system may assess cumulative usage data for time of operation, intensity of operation, intensity or levels of actuation, or other factors since the inception of use of the peripheral device in comparison to known lifecycle usage levels or duration of time stored and referenced at the backend information handling system and provided via a database by the peripheral device management service provider. The peripheral device management system may assess errors or reporting of lags, retries or other sub-optimal operational data as well. The method 400 may proceed to block 448 and the peripheral device management system may recommend decommissioning the current peripheral device and obtaining a replacement peripheral device prior to the failure of the peripheral device that is nearing the end of its useful lifecycle. In an embodiment, the recommendation may be made to the user or IT manager via the utilization report and transmitted to the client information handling system peripheral device reporting module. The utilization report may notify of the end of service life cycle, request decommissioning the end of service life cycle peripheral device and permission to replace with another peripheral device or may automatically decommission the end-of-life cycle peripheral device and add a replacement with notification and instructions for return and replacement. The peripheral device management system may report to the user or enterprise account for peripheral device management services and adjust the account according to permission or a swap as described if applicable depending on the subscription. Thereafter, the method 400 may proceed to decision 450. Returning to decision 446, if there is not a peripheral device that is near the end of the useful life for the peripheral device, the method 400 may also proceed to decision 450.

At decision 450, the method 400 may determine if there is an end of service contract or a decommissioning ordered or permitted for any peripheral device. For example, the end of service contract may be determined by contract with a service provider or terminated by the user or enterprise with the user account. If there is not an end of service contract for a particular peripheral device or the peripheral device is not decommissioned with the client information handling system, the method may end. Conversely, at decision 450, if there is an end of service contact or a decommissioning for a particular peripheral device, the method 400 may proceed to decision 452. At decision 452, the method 400 may require that the peripheral device be returned and may determine if the peripheral device with the end of lifecycle or decommissioning is missing. If the peripheral device with the end-of-life cycle or that is decommissioned is not missing, the method 400 may end. On the other hand, at decision 452, if the peripheral device with the end-of-life cycle or that is decommissioned is missing, the method 400 may proceed to block 454 and the method 400 may report last known location of the missing peripheral device. For example, the last known location of the missing peripheral device may be reported to the user of the client information handling system or the IT manager via the peripheral device management system 350 within the backend information handling system 318 shown in FIG. 3. From block 454, the method 400 may move to block 456 and the method 400 may report the cost to replace missing peripheral device and adjust the user account for the user or enterprise accordingly. For example, in an embodiment, the cost to replace missing peripheral device may be reported to the user of the information handling system via the peripheral device management system 350 within the backend information handling system 318 shown in FIG. 3. Thereafter, the method 400 may end.

The blocks of the flow diagrams of FIG. 4A through FIG. 4C or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Information handling systems, modules, resources, or programs that are in communication with one another need not be in continuous communication with each other, unless expressly specified otherwise. In addition, information handling systems, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
   a processor;
   a memory;
   a power management unit (PMU);
   a port or wireless antenna to operatively couple one or more peripheral devices to the information handling system;
   the processor executing code instructions of a peripheral devices reporting module for managing the one or more peripheral devices in coordination for a remotely located peripheral device management system, wherein the processor is configured to:
   establish a device identification for the information handling system;
   collect identifying information and logs a serial number for each of the one or more peripheral devices; and associate the serial number of each of the one or more peripheral devices with the device identification of the information handling system in a manifest;
a network interface device to transmit to the remotely located peripheral device management system the manifest of the device identification of the information handling system and the identifying information of the one or more peripheral devices to be associated a user account for peripheral device management services; and
the peripheral devices reporting module to collect usage data from the one or more peripheral devices that are operatively coupled to the information handling system to report such usage data to the remotely located peripheral device management system to monitor peripheral device usage lifecycle status or peripheral device health status.

2. The information handling system of claim 1, further comprising:
an embedded controller utilizes the network interface device to transmit the usage data to a backend information handling system executing the remotely located peripheral device management system via an out of band wireless communication link, wherein the network interface device includes a wireless adapter.

3. The information handling system of claim 2, wherein the usage data is analyzed at the backend information handling system to calculate a utilization of at least one of the one or more peripheral devices to compare a current peripheral device usage log level with a known lifetime usage level for the at least one peripheral devices to determine the peripheral device usage lifecycle status.

4. The information handling system of claim 2, wherein the usage data is analyzed at the backend information handling system to calculate a utilization of at least one of the one or more peripheral devices to assess overuse or underuse of the compared to typical utilization rates for the at least one peripheral devices to determine the peripheral device health status of the at least one peripheral device in a near-term operation window.

5. The information handling system of claim 2, further comprising:
the network interface device to receive a utilization report from the backend information handling system, wherein the utilization report includes the peripheral device health status to indicate whether any of the one or more peripheral devices is overutilized and wherein the utilization report includes at least one recommendation for any overutilized peripheral devices.

6. The information handling system of claim 2, further comprising:
the network interface device to receive a utilization report from the backend information handling system, wherein the utilization report includes the peripheral device health status to indicate whether any of the one or more peripheral devices is underutilized and wherein the utilization report includes at least one recommendation for any underutilized peripheral devices.

7. The information handling system of claim 2, further comprising:
the network interface device receives a utilization report from the backend information handling system, wherein the utilization report includes the peripheral device usage lifecycle status to indicate an end of service life has been reached for any of the one or more peripheral devices.

8. The information handling system of claim 2, wherein the usage data is collected via a unified extensible firmware interface (UEFI) module within a basic input/output system (BIOS) of the information handling system and stored in a secure partition of memory.

9. The information handling system of claim 2, wherein the usage data is collected via an operating system (OS) module within an OS of the information handling system.

10. A method implemented at a client information handling system comprising:
receiving, via a network interface device, a manifest including a device identification for a client information handling system and logged serial numbers for each of one or more peripheral devices operatively coupled to the client information handling system and associated with the device identification;
associating, via a processor, the device identification for the client information handling system with a user account for peripheral device management services;
receiving collected usage data for the one or more peripheral devices that are operatively coupled to the client information handling system; and
determining, executing code of a peripheral device management system, peripheral device usage lifecycle status or peripheral device health status of the one or more peripheral devices that are operatively coupled to the client information handling system.

11. The method of claim 10, wherein receiving the usage data from the client information handling system occurs via an out of band wireless link to the client information handling system.

12. The method of claim 10, further comprising:
analyzing the usage data to calculate a rate of utilization over the expected life of the one or more peripheral devices based on detected operational metrics to determine the peripheral device usage lifecycle status of the one or more peripheral devices.

13. The method of claim 10, further comprising:
analyzing the usage data to calculate a rate of utilization of the one or more peripheral devices over a period of time based on detected operational metrics to determine if any of the one or more peripheral devices is overutilized or if any of the one or more peripheral devices is underutilized to assess the peripheral device health status of the one or more peripheral devices.

14. The method of claim 10, further comprising:
determining whether the end of the service contract or de-commissioning of one of the peripheral devices; and
generating a recommendation to replace or return the one of the peripheral devices in a utilization report for the client information handling system.

15. The method of claim 14, further comprising:
determining if the one of the peripheral devices is missing; and
reporting the replacement cost of the one of the peripheral devices and adjust the user account for peripheral device management services for the client information handling system.

16. The method of claim 10, further comprising:
determining whether one of the peripheral devices is to be replaced; and
recording the replacement peripheral device in the user account for peripheral device management services for the client information handling system.

17. An information handling system comprising:
a processor;
a memory;

a power management unit (PMU);
a port or wireless antenna to operatively couple one or more peripheral devices to the information handling system;
the processor executing code instructions of a peripheral devices reporting module for managing the one or more peripheral devices in coordination for a remotely located peripheral device management system, wherein the processor is configured to:
  establish a device identification for the information handling system;
  collect identifying information and logs a serial number for each of the one or more peripheral devices; and
  associate the serial number of each of the one or more peripheral devices with the device identification of the information handling system in a manifest;
a network interface device to transmit to the remotely located peripheral device management system the manifest to be associated at the remotely located peripheral device management system with a user account to manage a peripheral device management subscription associated with the information handling system; and
the peripheral devices reporting module configured to collect usage data from the one or more peripheral devices that are operatively coupled to the information handling system.

18. The information handling system of claim 17, wherein the peripheral devices reporting module includes a unified extensible firmware interface (UEFI) module operating on a basic input/output system (BIOS) of the information handling system to passively collect usage data by storing a list of the one or more peripheral devices on every boot and write a log of the one or more peripheral devices into an encrypted partition in a memory at the information handling system.

19. The information handling system of claim 17, wherein the peripheral devices reporting module comprises an operating system (OS) module operating on an operating system (OS) of the information handling system to actively log active usage of the one or more peripheral devices through a management interface within the information handling system and store the active usage in an encrypted partition in a memory at the information handling system.

20. The information handling system of claim 17, further comprising:
  the peripheral devices reporting module to transmit the usage data to remotely located peripheral device management system, wherein the usage data is analyzed at the backend information handling system to calculate a utilization of each of the one or more peripheral devices to generate a utilization report of the one or more peripheral devices.

* * * * *